(12) United States Patent
Miyagi

(10) Patent No.: US 10,902,435 B2
(45) Date of Patent: Jan. 26, 2021

(54) CHECKOUT SYSTEM

(71) Applicant: TOSHIBA TEC KABUSHIKI KAISHA, Tokyo (JP)

(72) Inventor: Daisuke Miyagi, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 368 days.

(21) Appl. No.: 15/885,989

(22) Filed: Feb. 1, 2018

(65) Prior Publication Data

US 2018/0240126 A1 Aug. 23, 2018

(30) Foreign Application Priority Data

Feb. 21, 2017 (JP) ................. 2017-030134

(51) Int. Cl.
*G06Q 20/00* (2012.01)
*G06Q 30/00* (2012.01)
*G07G 1/00* (2006.01)
*G06K 9/00* (2006.01)
*G07G 3/00* (2006.01)
*G07G 1/14* (2006.01)
(Continued)

(52) U.S. Cl.
CPC ....... *G06Q 30/016* (2013.01); *G06K 9/00771* (2013.01); *G06Q 20/20* (2013.01); *G07G 1/0009* (2013.01); *G07G 1/0036* (2013.01); *G07G 1/14* (2013.01); *G07G 3/00* (2013.01); *G06F 16/5854* (2019.01); *G07G 1/0018* (2013.01)

(58) Field of Classification Search
CPC .......................... G06Q 30/016; G06K 9/00771
USPC ...................................... 705/16, 21
See application file for complete search history.

(56) References Cited

U.S. PATENT DOCUMENTS 5,595,264 A * 1/1997 Trotta, Jr. ............... A47F 9/047
186/56
2003/0102373 A1* 6/2003 Swartz ................... G07G 3/003
235/383
(Continued)

FOREIGN PATENT DOCUMENTS

| EP | 2993635 A | 3/2016 |
| EP | 3040894 A | 7/2016 |
| JP | 2013186495 A | 9/2013 |

OTHER PUBLICATIONS

Extended European Search Report dated Jun. 11, 2018 in related European Patent Application 18157615.8, 9 pages.

*Primary Examiner* — Rokib Masud
(74) *Attorney, Agent, or Firm* — Kim & Stewart LLP

(57) ABSTRACT

A checkout system includes a register machine having a camera for capturing an image of a customer initiating a transaction, a checkout machine configured to perform checkout processing on the transaction, and a server in communication with the register machine and the checkout machine. The server includes a storage section in which the transaction information including an image of the customer captured with the camera, is stored, and a processor, which determines whether or not the checkout processing of the transaction has completed and erases the image of the customer at a first timing that is after determining that the checkout processing has completed, if an indication is received that the customer may have left behind an item, and at a second timing that is earlier than the first timing and is after determining that the checkout processing has completed, if the indication is not received.

14 Claims, 11 Drawing Sheets

(51) Int. Cl.
*G06Q 20/20* (2012.01)
*G06F 16/583* (2019.01)

(56) References Cited

U.S. PATENT DOCUMENTS

| | | | |
|---|---|---|---|
| 2005/0046570 A1* | 3/2005 | Conzola | G06Q 20/204 340/568.1 |
| 2016/0180191 A1 | 6/2016 | Nobuoka et al. | |

* cited by examiner

CHECKOUT SYSTEM

CROSS-REFERENCE TO RELATED APPLICATION

This application is based upon and claims the benefit of priority from Japanese Patent Application No. 2017-030134, filed Feb. 21, 2017, the entire contents of which are incorporated herein by reference.

FIELD

Embodiments described herein relate generally to a checkout system.

BACKGROUND

In recent years, in a retail store such as a supermarket, a self-service type checkout apparatus by which a customer performs a registration operation and a checkout operation of a commodity is known. A semi-self-service type checkout apparatus provided with a registration device used by a store clerk to perform the registration operation of the commodity and a checkout device used by a customer to perform the checkout operation is also known.

In these checkout apparatuses, in order to identify a customer who leaves the retail store without carrying out a checked-out item, the face of the customer is captured. If the customer leaves the store, the store clerk can confirm that the customer has left behind the checked-out item immediately based on a captured image.

However, since the captured image of the customer who executes the checkout operation normally is erased, for example, if the customer leaves behind the checked-out item at the checkout apparatus and later returns back, there is a case in which the store clerk cannot confirm whether he/she is the customer who left behind the check-out item.

DETAILED DESCRIPTION

In accordance with an embodiment, A checkout system includes a register machine having a camera for capturing an image of a customer initiating a transaction, a checkout machine configured to perform checkout processing on the transaction, and a server in communication with the register machine and the checkout machine. The server includes a storage section in which transaction information relating to the transaction is stored, the transaction information including an image of the customer captured with the camera, and a processor configured to determine whether or not the checkout processing of the transaction has completed and to erase the image of the customer stored in the storage section at a first timing that is after determining that the checkout processing has completed, if an indication is received by the server that the customer may have left behind an item, and at a second timing that is earlier than the first timing and is after determining that the checkout processing has completed, if the indication is not received by the server.

Hereinafter, with reference to FIG. 1 to FIG. 11, an information processing apparatus and a method for confirming a customer who leaves an object behind according to an embodiment is described in detail. In accordance with an embodiment, a semi-self-service type checkout apparatus provided with a registration device used by a store clerk to execute a registration operation of a commodity and a checkout device used by a customer to execute a checkout operation is described as an example, and a server connected to the registration device and the checkout device is described as an example of the information processing apparatus. The embodiment described below is not intended to limit the scope of the present invention.

Figure 1:
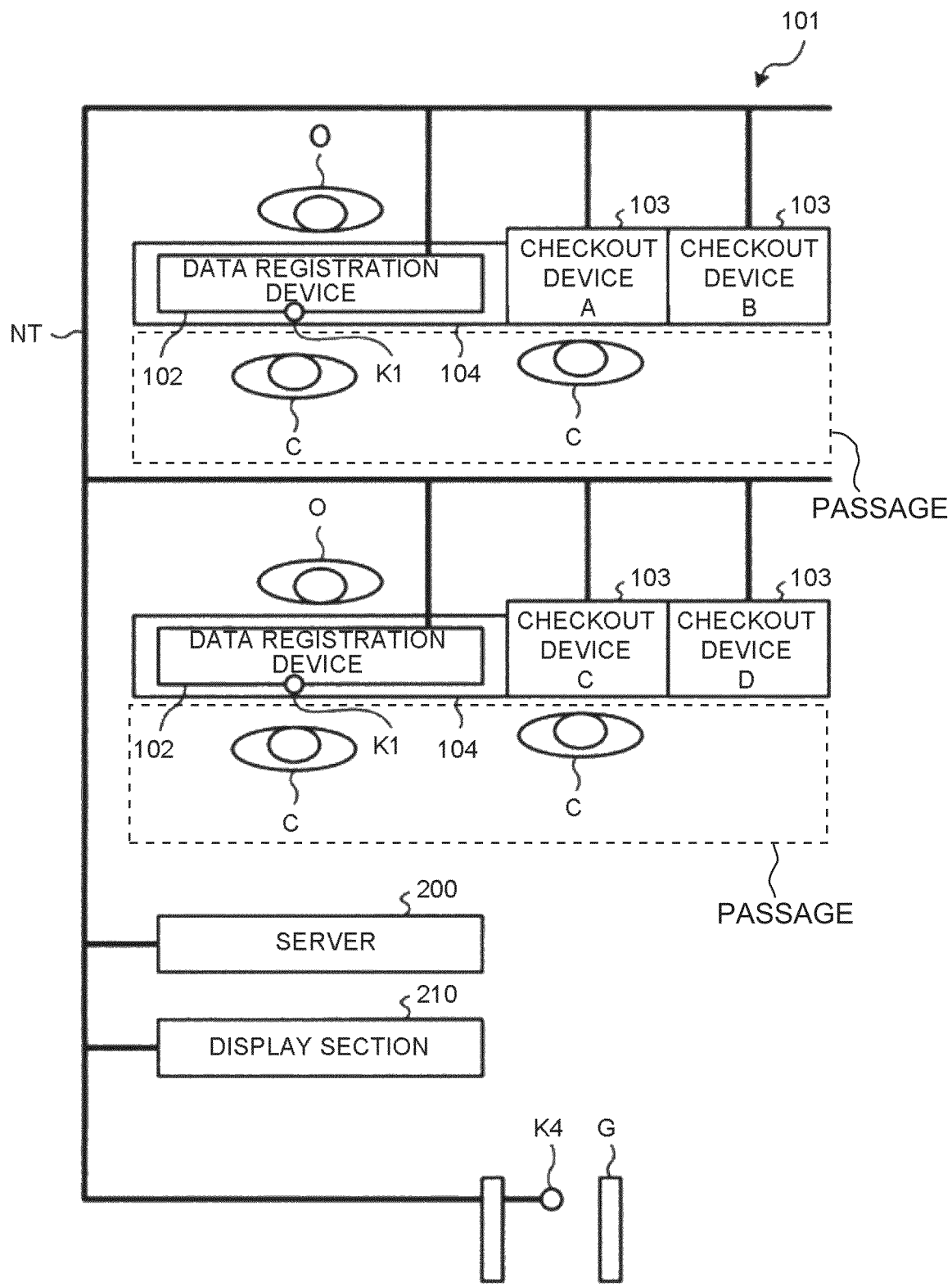
FIG. 1 is a schematic diagram illustrating the whole of a checkout system according to a first embodiment.

FIG. 1 is a schematic diagram illustrating the entire configuration of a checkout system 101 according to a first embodiment. As shown in FIG. 1, the checkout system 101 includes a plurality of register machines, depicted herein as data registration devices 102, a plurality of checkout machines, depicted herein as checkout devices 103, a server 200, a display section 210 (which includes a notification device and a display section), and a camera K4. The plurality of data registration devices 102, the plurality of checkout devices 103, the server 200, the display section 210, and the camera K4 are electrically connected to each other via a communication line NT such as a LAN (Local Area Network).

Each of the data registration devices 102 executes a sales registration processing of a commodity to be sold by imaging a symbol attached to a commodity. The sales registration processing includes a processing of displaying and storing commodity information such as a commodity name and a price of the commodity based on a commodity code for identifying the commodity associated with the symbol read from the commodity. The data registration device 102 is operated by an operator O who is a store clerk of a retail store, for example. An operation performed by the store clerk O to enable the data registration device 102 to capture a symbol attached to the commodity is referred to as a registration operation.

The data registration device 102 includes a camera K1. The camera K1 is provided with a CCD image sensor (not shown) and captures an image of a customer C standing in front of the data registration device 102. The camera K1 captures an image centered on a face of the customer C who is present in a passage (depicted in FIG. 1) to purchase the commodity. The captured image of the customer C is transmitted to the server 200 in association with transaction information of a transaction including the commodity information subjected to the sales registration processing.

The checkout device 103 is provided close to the data registration device 102 and at a downstream side of the data registration device 102 in a passing direction of the customer C (moving from left to right in FIG. 1). Two checkout devices 103 are provided for one data registration device 102. In the example in FIG. 1, checkout devices 103 corresponding to one data registration device 102 includes a checkout device A and a checkout device B. The checkout device A and the checkout device B are connected to the corresponding data registration device 102 and arranged linearly adjacent to a table 104. Further, the other checkout devices 103 corresponding to the other data registration device 102 includes a checkout device C and a checkout device D. The checkout device C and the checkout device D are connected to the other data registration device 102 and arranged linearly adjacent to a table 104. Therefore, in the present embodiment, a passage of the customer C is formed between the plurality of tables 104. The customer C moves along the passage from the data registration device 102 to the checkout device 103 side. The checkout device 103 is operated by the customer C. The operation of the checkout device 103 performed by the customer C is called a checkout operation.

The checkout device 103 executes a checkout processing according to the checkout operation. The checkout processing includes a processing of displaying a total amount and a change amount relating to the transaction with the customer based on the commodity information of the commodity to which the sales registration processing is executed, and a processing of issuing a receipt printed with commodity information and settlement information of the commodity to which a settlement processing is executed.

The server 200 receives the transaction information of the commodity for which the data registration device 102 executes the sales registration processing and the captured image associated with the transaction information from the data registration device 102. The server 200 stores the received transaction information and the image captured by the camera K1 in an associated manner. In response to a request from the checkout device 103, the server 200 transmits the transaction information of the designated customer to the checkout device 103. The server 200 receives an image captured by a camera K2 described later and stores it.

The camera K4 is installed near an exit and entrance G of the retail store. The camera K4 has, for example, a CCD image sensor (not shown), and uses this CCD image sensor to capture an image of the customer. The camera K4 captures an image of the customer centered on the face of the customer who enters and leaves the retail store. The camera K4 sends the captured image of the customer to the server 200.

The display section 210 is installed near the exit and entrance G of the store. The display section 210 displays information and messages for the customer who enters and leaves the retail store. The display section 210 is installed at a position and an angle where the displayed message and information are easy to see for the customer who leaves the retail store in particular.

Figure 2:
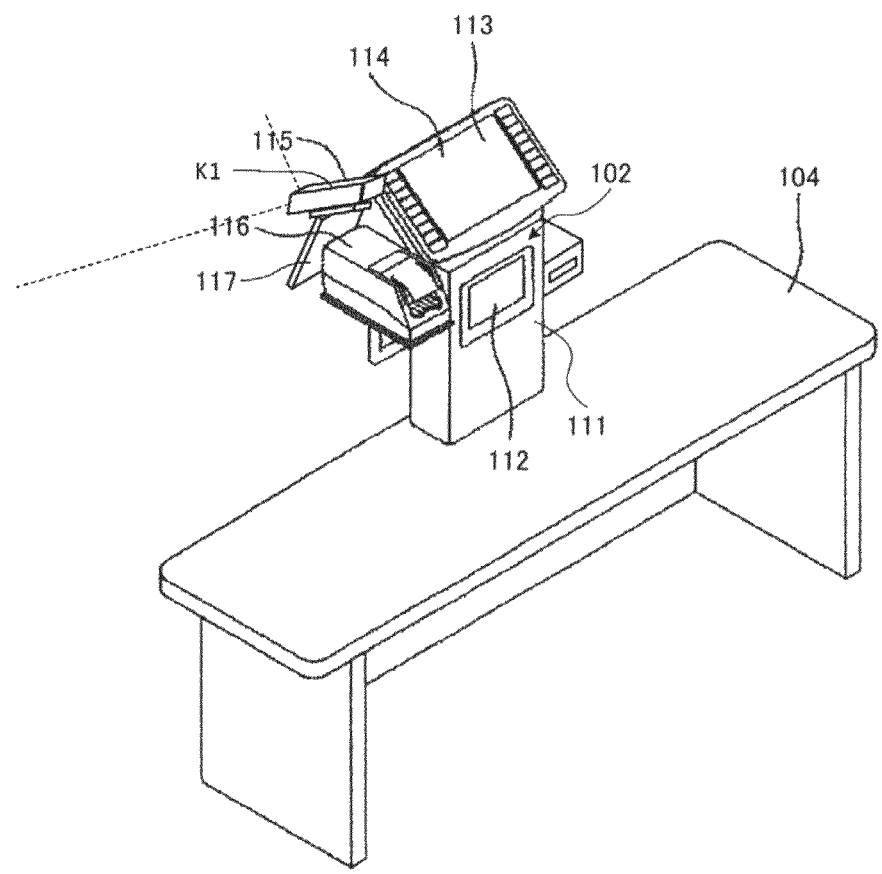
FIG. 2 is a perspective view illustrating the appearance of a data registration device.

Next, the configuration of the data registration device 102 is described in detail. FIG. 2 is a perspective view illustrating the appearance of the data registration device 102. As shown in FIG. 2, the data registration device 102 installed on an upper surface of the table 104 is constituted based on a vertical type code reader 111 having a reading window 112 facing the store clerk O side. In the code reader 111, a code reader 119 (refer to FIG. 4) is arranged at a rear side of the reading window 112. For example, a symbol such as a barcode is attached to the commodity. The symbol encodes information for specifying the commodity to which the barcode is attached. If the store clerk O holds the commodity in hand and enables the symbol to pass through the front of the reading window 112, the code reader 119 photographs the commodity. The data registration device 102 acquires a commodity code for specifying the commodity based on the captured symbol. The data registration device 102 reads out commodity information (a commodity name, a price, etc.) of the commodity from a commodity master file 742 (refer to FIG. 4) based on the acquired commodity code. The data registration device 102 executes the sales registration processing based on the read commodity information. The code reader 119 may be a scanner that optically reads the symbol.

The data registration device 102 also includes a display section for operator 114 and an operation section 115 at the top of the code reader 111. The display section for operator 114 displays the commodity name, the price and the like of the commodity photographed in the code reader 111. The operation section 115 assists the store clerk O in inputting the commodity information. The operation section 115 includes a touch panel 113 provided on the surface of the display section for operator 114.

At the left side of the data registration device 102 if viewed from the store clerk O side, a printing section 116 is positioned on the left side of the code reader 111. The printing section 116 issues a slip on which a barcode indicating a transaction number for specifying a transaction is printed.

At the left side of the data registration device 102 if viewed from the store clerk O side, a display section for customer 117 for the customer C is provided. The display section for customer 117 displays the commodity information, a total price, etc. of the commodity subjected to the sales registration processing.

The data registration device 102 specifies the commodity from the symbol included in the image using a known pattern recognition technology based on the image captured by the code reader 111. Instead of the pattern recognition technology, the photographed commodity may be specified using a known generic object recognition technology for recognizing an object included in the image.

Next, the data registration device 102 displays a screen for receiving an input such as the number of the specified commodities on the display section for operator 114. Then, the data registration device 102 executes the sales registration processing based on the information such as the commodity code of the commodity, the input of which is received, the input number, etc.

The data registration device 102 includes the camera K1 adjacent to the display section for customer 117. The captured image of the customer is transmitted to the server 200 in association with the commodity information of the transaction which includes the commodity information subjected to the sales registration processing.

Figure 3:
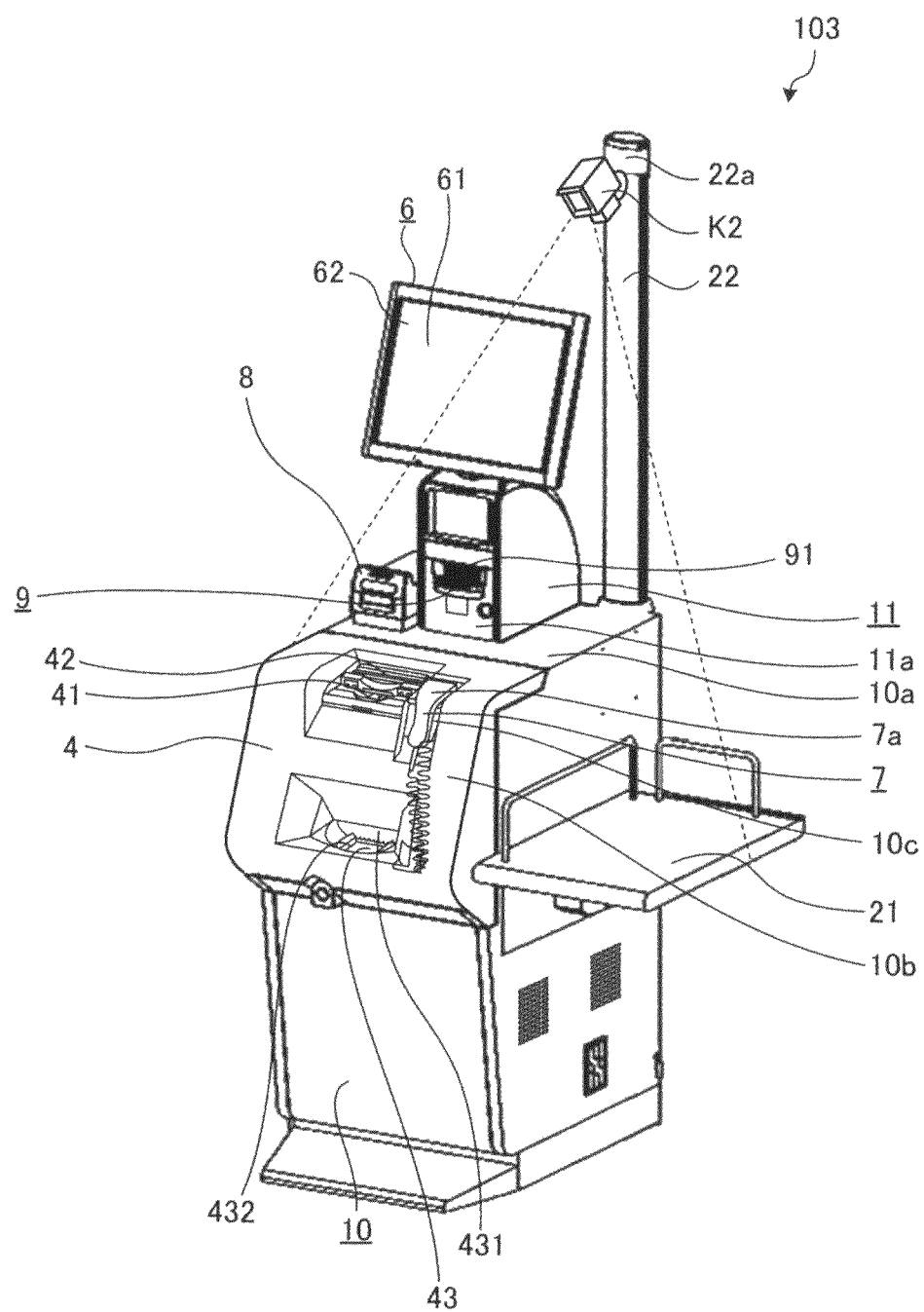
FIG. 3 is a perspective view illustrating the appearance of a checkout device.

The checkout device 103 with which the customer C executes the checkout operation and the checkout processing by himself/herself is described below. FIG. 3 is a perspective view illustrating the appearance of the checkout device 103.

The checkout device 103 includes a first housing 10 and a second housing 11. In the first housing 10, a change dispensing machine 4 and a card reader 8 are provided.

The change dispensing machine 4 is provided with a bill/coin depositing ports 41, a bill dispensing port 42, and a coin dispensing section 43. The coin dispensing section 43 includes a payout port 431 and a receiving tray 432. The change dispensing machine 4 receives bills and coins inserted into the bill/coin depositing ports 41 and stores them in a separated manner. Then, the change dispensing machine 4 pays out change through the bill dispensing port 42 and the payout port 431. Coins dispensed through the payout port 431 are collected in the receiving tray 432.

The card reader 8 is arranged on an upper surface 10a of the first housing 10 at the left side of the second housing 11 when viewed from the customer side. The card reader 8 reads and writes information from and to a storage medium such as a credit card.

The handy scanner 7 is detachably arranged on a front surface 10b of the first housing 10. A holding section 10c for holding a tip portion 7a of the handy scanner 7 in a hooked state is provided at the upper right part of the front surface 10b of the first housing 10 when viewed from the customer side. The handy scanner 7 reads the barcode (corresponding to the transaction number) printed on the slip issued by the data registration device 102.

The second housing 11 is placed on the upper surface 10a of the first housing 10, and includes a display operation panel 6 and the printing section 9. The display operation panel 6 is provided with a display section 61 and an operation section 62. The display section 61 displays an image. The operation section 62 is a touch panel provided on the surface of the display section 61.

The printing section 9 has a printer section (not shown) built in the second housing 11 and a receipt issuing port 91 provided on a front surface 11a, which faces the customer side, of the second housing 11. The printing section 9 issues a receipt obtained by printing the commodity information and checkout information of the purchased commodity on a paper in a form of, for example, a thermal head from the receipt issue port 91.

The checkout device 103 includes a basket holding table 21 at one side of the first housing 10. The basket holding table 21 is used for holding a basket containing the commodity if the customer C performs the checkout operation.

Furthermore, in the checkout device 103, a display pole 22 as a notification section for displaying a current state of the checkout device 103 is vertically arranged on the upper surface 10a of the first housing 10. The display pole 22 has a light emitting section 22a that selectively emits blue and red light at a tip portion thereof. The light emitting section 22a emits the light if the customer performs an operation to call a store clerk, for example, in a case of being troublesome in the operation of the checkout device 103, in a case in which an error occurs in the checkout device 103, or the like.

The camera K2 is provided at the tip portion of the display pole 22. The camera K2 has a CCD image sensor (not shown), and uses this CCD image sensor to capture an image of the checkout operation from the above. The camera K2 photographs the vicinity of the basket holding table 21 and the vicinity of the entire upper surface 10a of the first housing 10 from the above. Therefore, if the customer places a foreign object such as a wallet or the like around the basket holding table 21 or the upper surface 10a, the foreign object is captured. On the basis of the image captured by the camera K2, the checkout device 103 determines that the customer C leaves an object behind if a foreign object is captured (details of the algorithm to determine the foreign object is described later), adds the information about the object left behind (hereinafter, referred to as "forgotten object information") to the transaction information, and transmits the information to the server 200. The server 200 stores information indicating that the customer leaves the object behind based on the forgotten object information received from the checkout device 103.

The checkout device 103 executes the checkout processing as the customer C performs the checkout operation with such a checkout device 103 himself/herself. In the case of checkout with the cash, the checkout device 103 displays a payment amount to be paid by the customer C based on the transaction information received from the server 200. The customer C performs the checkout operation to deposit the cash based on the payment amount. The checkout device 103 calculates a change amount based on deposited cash and dispenses the change from the change dispensing machine 4. In the case of checkout with a credit card, the customer C performs the checkout operation of inserting a credit card into the card reader 8. The checkout device 103 executes the checkout processing by the credit card based on the transaction information. The checkout device 103 issues a receipt on which the checkout information of the checkout processing and the commodity information received from the server 200 are printed from the printing section 9.

In such a checkout system 101, the data registration device 102 executes the sales registration processing of the commodity accompanying the registration operation by the store clerk O. Then, the data registration device 102 transmits the transaction information to the server 200 and issues a slip on which the transaction number for specifying the transaction is printed as a barcode. The data registration device 102 transmits the captured image of the customer and the transaction information to the server 200 in an associated manner. The customer C moves from the data registration device 102 to the checkout device 103 with a basket containing the commodity to which the sales registration processing is executed.

In the checkout device 103, the customer C who moves to the checkout device 103 inputs the transaction number, represented by a barcode printed on the issued slip, using the handy scanner 7. The checkout device 103 receives the transaction information based on the input transaction number from the server 200. Then, the customer C performs the checkout operation relating to the transaction in the checkout device 103. The checkout device 103 executes the checkout processing based on the transaction information received from the server 200. After the checkout device 103 completes the checkout processing, the checkout device 103 transmits checkout completion information indicating that the checkout processing is completed to the server 200. If the checkout device 103 determines that the customer left an object behind based on the image captured by the camera K2, the checkout device 103 transmits the checkout completion information to which the forgotten object information is added to the server 200.

The server 200, when receiving the forgotten object information, stores the captured image of the customer who leaves the object behind according to a predetermined timing. The predetermined timing is a predetermined period of time such as one hour, one day, one week or the like, or a specific time of day such as midnight at which the date is changed.

Figure 4:
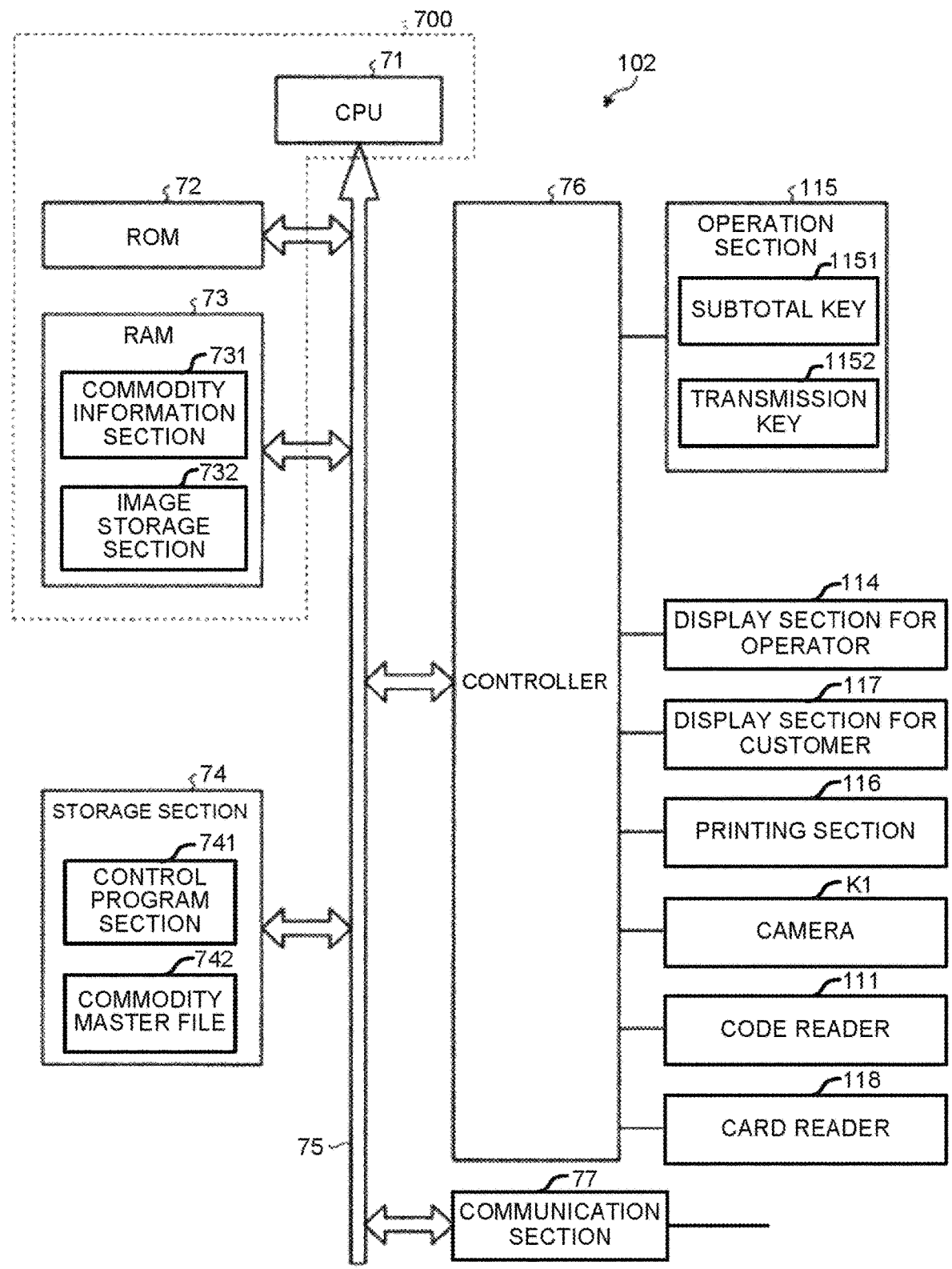
FIG. 4 is a block diagram illustrating the hardware configuration of the data registration device.

Next, the hardware configuration of the data registration device 102, the checkout device 103, and the server 200 are described. FIG. 4 is a block diagram illustrating the hardware configuration of the data registration device 102.

As shown in FIG. 4, the data registration device 102 includes a CPU (Central Processing Unit) 71, a ROM (Read Only Memory) 72, a RAM (Random Access Memory) 73, a storage section 74, and the like. The CPU 71 is a control main body. The ROM 72 stores various programs. The RAM 73 temporarily stores various data. The storage section 74 stores various programs. The CPU 71, the ROM 72, the RAM 73 and the storage section 74 are connected to each other via a data bus line 75. The CPU 71, the ROM 72, and the RAM 73 constitute a control section 700. The CPU 71 executes a control program stored in the ROM 72 and the storage section 74 and reads data from and writes data into the RAM 73 to perform a control processing described later.

The RAM 73 includes a commodity information section 731 for storing the commodity information of the commodity subjected to the sales registration processing. The RAM 73 also includes an image storage section 732 which stores the image of the customer captured by the camera K1.

The storage section 74 is composed of a nonvolatile memory such as an HDD (Hard Disk Drive) or a flash memory in which stored information is held even if the power supplied to the storage section 74 is cut off. The storage section 74 includes a control program section 741 for storing a control program. The storage section 74 also stores a commodity master file 742. The commodity master file 742 stores the commodity information such as the commodity name, a price (unit price), attributes, etc. of the commodity in addition to the commodity code for specifying the commodity.

The control section 700 is connected to the operation section 115, the display section for operator 114, the display section for customer 117, the printing section 116, the camera K1, the code reader 111 and the card reader 118 via the data bus line 75 and the controller 76.

The operation section 115 has a subtotal key 1151 at a position corresponding to a figure of a "subtotal key" displayed on the display section for operator 114. The operation section 115 includes a transmission key 1152 at a position corresponding to a figure of a "transmission key" displayed on the display section for operator 114. In the following description, for example, "a key provided in the operation section 115 corresponding to the display of a key in the display section for operator 114" is briefly described as "a key displayed on the display section for operator 114".

The subtotal key 1151 is operated by the store clerk O after the store clerk O completes the registration operation to calculate a subtotal of the purchase price of commodities. The transmission key 1152 is operated by the store clerk O at the time of sending the transaction information to the server 200.

The control section 700 is connected to a communication section 77 via the data bus line 75. The communication section 77 is connected to another data registration device 102, the checkout device 103, the server 200, the display section 210 and the like via the communication line NT.

Figure 5:
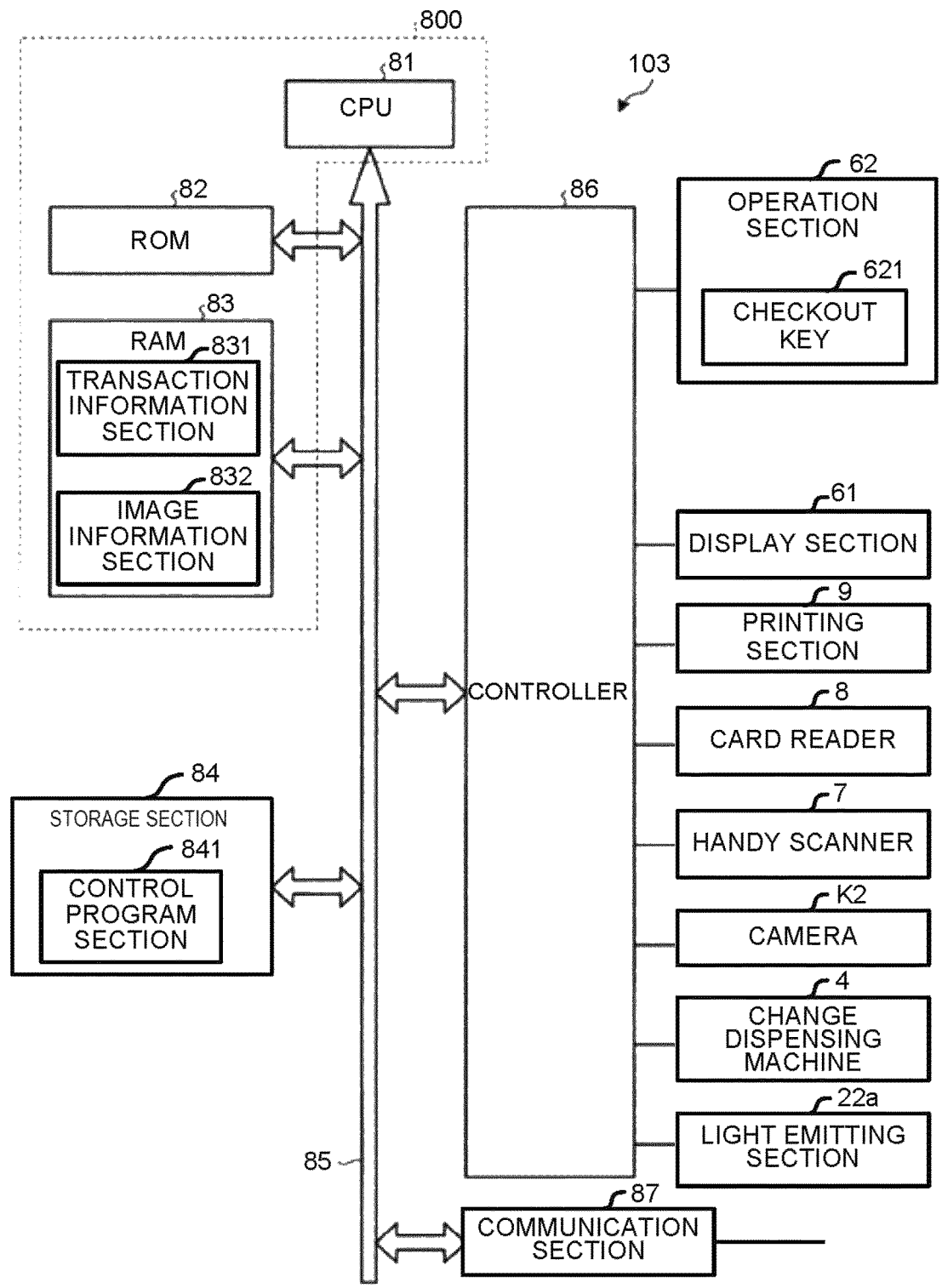
FIG. 5 is a block diagram illustrating the hardware configuration of the checkout device.

FIG. 5 is a block diagram illustrating the hardware configuration of the checkout device 103. As shown in FIG. 5, the checkout device 103 includes a CPU 81, a ROM 82, a RAM 83, a storage section 84, and the like. The CPU 81 is a control main body. The ROM 82 stores various programs. The RAM 83 copies or develops various data. The storage section 84 stores various programs. The CPU 81, the ROM 82, the RAM 83, and the storage section 84 are connected to each other via a data bus line 85. The CPU 81, the ROM 82, and the RAM 83 constitute a control section 800. The CPU 81 executes the control program stored in the ROM 82 and the storage section 84 and copied and developed in the RAM 83 to perform a control processing described later.

The RAM 83 includes a transaction information section 831 for storing the transaction information of the commodity, for which the sales registration processing is executed, as received from the server 200 based on the transaction number input by using the handy scanner 7. The transaction information does not include the captured image associated therewith. The RAM 83 also includes an image information section 832 for storing the image captured by the camera K2.

The storage section 84 is composed of a nonvolatile memory such as an HDD or a flash memory in which stored information is held even if the power supplied to the storage section 84 is cut off. The storage section 84 includes a control program section 841 for storing a control program.

The control section 800 is connected to the operation section 62, the display section 61, the printing section 9, the card reader 8, the handy scanner 7, the camera K2, the change dispensing machine 4 and the light emitting section 22a via the data bus line 85 and a controller 86.

The operation section 62 includes a checkout key 621 displayed in the display section 61. The checkout key 621 is operated by the customer C to finish the checkout operation in the checkout device 103. For example, the customer operates the checkout key 621 after depositing the predetermined cash against the payment amount, which is paid by the customer, displayed on the display section 61.

The control section 800 is connected to a communication section 87 via the data bus line 85. The communication section 87 is connected to another checkout device 103, the data registration device 102, the server 200, the display section 210 and the like via the communication line NT.

Figure 6:
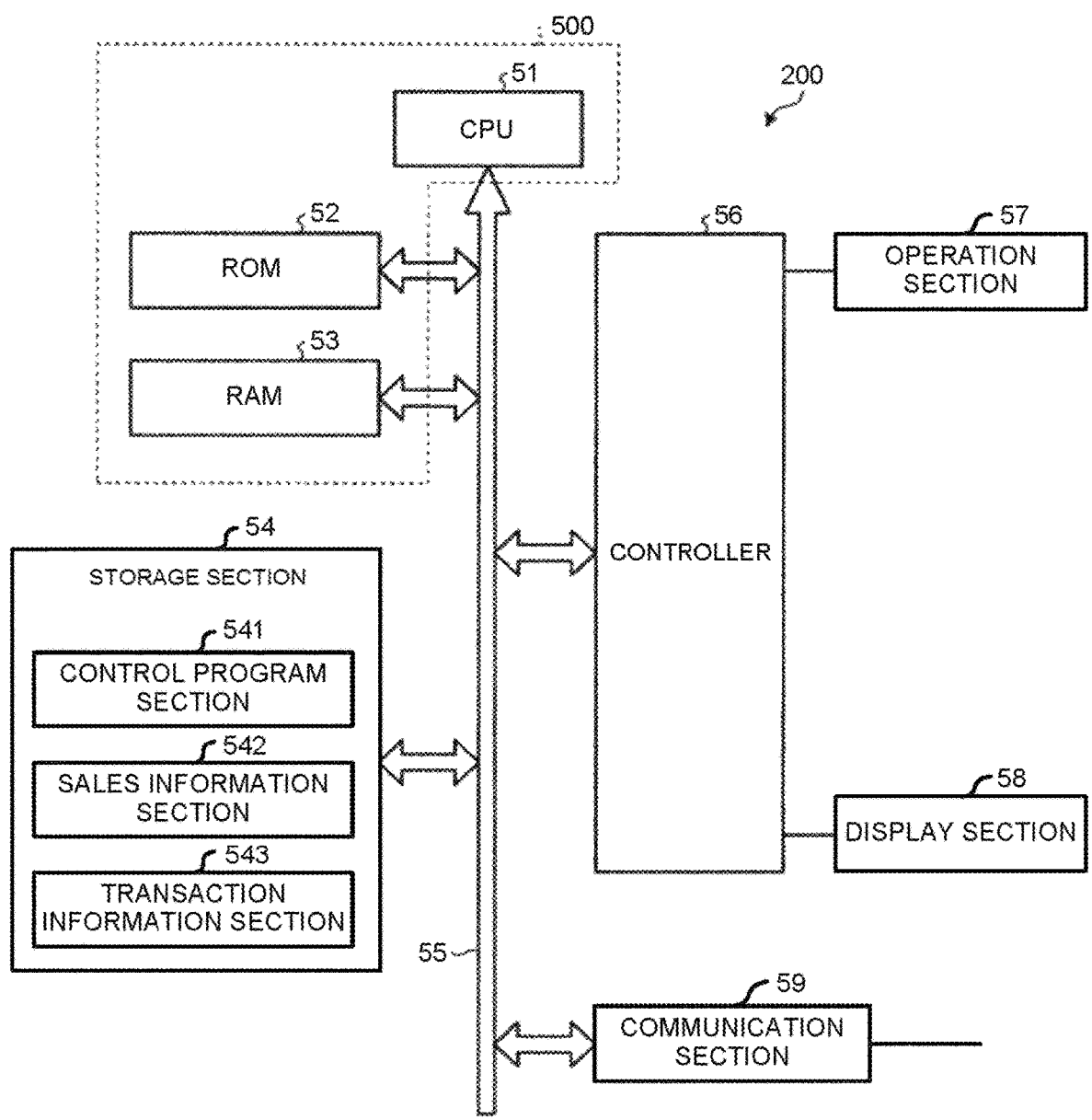
FIG. 6 is a block diagram illustrating the hardware configuration of a server.

FIG. 6 is a block diagram illustrating the hardware configuration of the server 200. As shown in FIG. 6, the server 200 includes a CPU 51, a ROM 52, a RAM 53, a storage section 54, and the like. The CPU 51 is a control main body. The ROM 52 stores various programs. The RAM 53 copies or develops various data. The storage section 54 stores various programs. The CPU 51, the ROM 52, the RAM 53, and the storage section 54 are connected to each other via a data bus line 55. The CPU 51, the ROM 52, and the RAM 53 constitute a control section 500. The control section 500 executes a control processing described later through operation of the CPU 51 according to a control program stored in the ROM 52 and the storage section 54 and copied or decompressed into the RAM 53.

The storage section 54 is constituted by a nonvolatile memory such as an HDD or a flash memory in which stored information is held even if the power supplied to the storage section 54 is cut off. The storage section 54 includes a control program section 541 for storing the control program to be executed by the CPU 51.

The storage section 54 also has a sales information section 542 and a transaction information section 543. The sales information section 542 stores the sales information of the commodity subjected to the sales registration processing at the data registration device 102 and the checkout processing at the checkout device 103 to store the sales information. The sales information section 542 cumulatively stores sales information of the retail store in a predetermined period of time (for example, one day), sales information for each commodity, and the like. The transaction information section 543 stores the transaction information received from the data registration device 102 and the image captured by the camera K1 of the customer in an associated manner. The details of the transaction information section 543 are described later with reference to FIG. 7.

The control section 500 is connected to the operation section 57 and the display section 58 via the data bus line 55 and the controller 56.

The control section 500 is connected to a communication section 59 via the data bus line 55. The communication section 59 is connected to the checkout device 103, the data registration device 102, the display section 210, and the like via the communication line NT.

Figure 7:
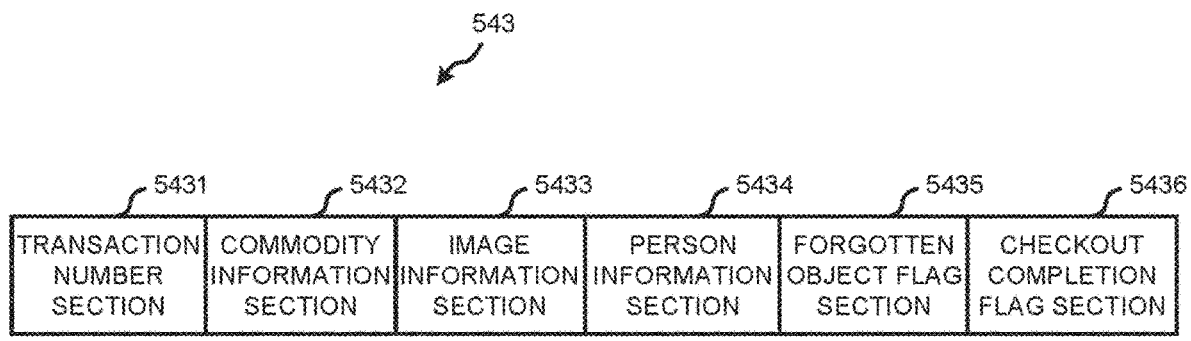
FIG. 7 is a diagram illustrating a memory configuration of a transaction information section of the server.

FIG. 7 is a memory map illustrating the memory configuration of the transaction information section 543 of the server 200. As shown in FIG. 7, the transaction information section 543 includes a transaction number section 5431, a commodity information section 5432, an image information section 5433, a person information section 5434, a forgotten object flag section 5435, and a checkout completion flag section 5436.

The transaction number section 5431 stores a number for specifying the transaction. The transaction number is issued in ACT S36 in FIG. 8 as described later. The commodity information section 5432 stores the commodity information of the commodity subjected to the sales registration processing at the data registration device 102 by the transaction number, respectively. The image information section 5433 stores the image of the customer captured by the camera K1 in association with the transaction number. The image information section 5433 stores the captured image of the customer who executes a transaction specified by the transaction number stored in the transaction number section 5431.

The person information section 5434 stores a facial parts information indicating the characteristics of a face of the customer in association with the transaction number based on the image stored in the image information section 5433. The facial parts information refers to data obtained by classifying the face of the person for each part, and is, for example, data indicating the characteristics of the parts, i.e., eyes, a nose, a mouth, an ear, and a chin of a person. The person information section 5434 also stores the characteristics (shape, color, etc.) of the clothes the customer wears (i.e., clothing information).

The forgotten object flag section 5435 stores a forgotten object flag indicating whether or not the customer leaves an object behind in the vicinity of the checkout device 103 in association with the transaction number. Based on the checkout completion information received from the checkout device 103, the control section 500 determines whether or not the customer leaves an object behind based on an image captured by the camera K2. If the control section 500 determines that the customer leaves an object behind, the control section 500 stores a forgotten object flag "1" in association with the commodity information of the customer.

The checkout completion flag section 5436 stores a checkout completion flag indicating whether or not the customer performs the checkout in the checkout device 103 in association with the transaction number. The control section 500 stores the checkout completion flag "1" in association with the transaction number in which the checkout processing in the checkout device 103 is completed, based on the checkout completion information received from the checkout device 103. The control section 500 determines that the checkout of the transaction with the checkout completion flag of "1" is completed.

The control processing by the data registration device 102, the checkout device 103 and the server 200 according to the checkout system 101 of the embodiment is described below.

First, the control processing executed by the control section 700 of the data registration device 102 according to a control program stored in the control program section 741 is described.

Figure 8:
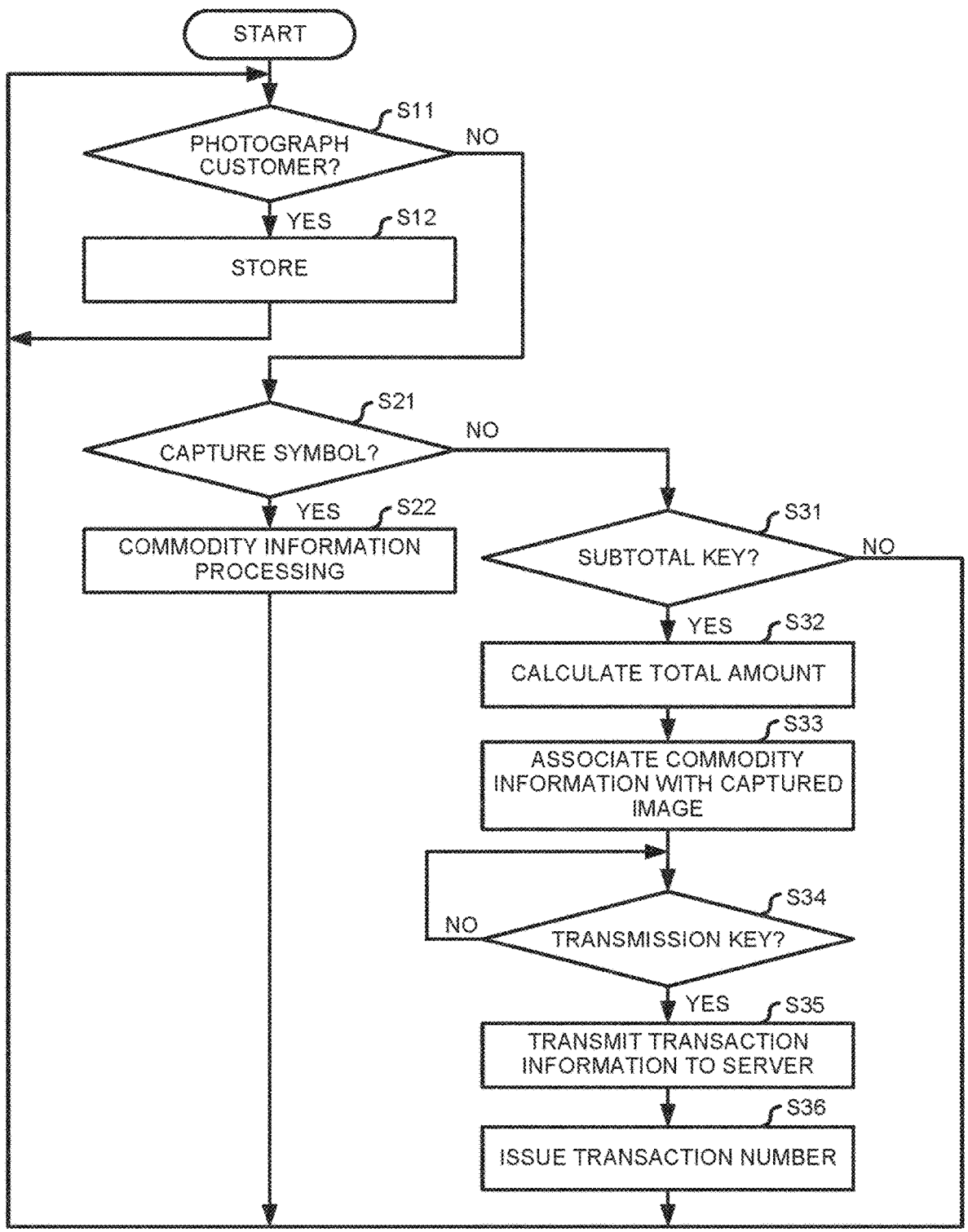
FIG. 8 is a flowchart depicting the flow of a control processing in the data registration device.

FIG. 8 is a flowchart depicting the flow of the control processing in the data registration device 102. As shown in FIG. 8, the control section 700 of the data registration device 102 determines whether or not an image of the customer captured by the camera K1 of the data registration device 102 (ACT S11) should be stored (e.g., when a new customer comes into view of the camera K1). If it is determined that the image should be stored (Yes in ACT S11), the control section 700 stores the captured image in the image storage section 732 (ACT S12). The control section 700 then returns to the processing in ACT S11.

If it is determined that the image of the customer should not be stored (e.g., because the image has already been stored) (No in ACT S11), the control section 700 determines whether or not the symbol attached to the commodity is captured by the code reader 111 (ACT S21). If it is determined that the symbol is captured by the code reader 111 (Yes in ACT S21), the control section 700 acquires the commodity code corresponding to the captured symbol and reads out the commodity information of the commodity specified by the commodity code from the commodity master file 742 and stores it in the commodity information section 731 (ACT S22). The control section 700 then returns to the processing in ACT S11.

On the other hand, if it is determined that the code reader 111 does not capture the symbol (No in ACT S21), the control section 700 determines whether or not the subtotal key 1151 is operated (ACT S31). If it is determined that the subtotal key 1151 is operated (Yes in ACT S31), the control section 700 calculates the total amount of the transaction based on the commodity information stored in the commodity information section 731 (ACT S32).

The control section 700 associates the commodity information stored in the commodity information section 731 with the captured image of the customer stored in the image storage section 732 (ACT S33). The control section 700 determines whether or not the transmission key 1152 is operated (ACT S34). The control section 700 waits for until the transmission key 1152 is operated (No in ACT S34). If it is determined that the transmission key 1152 is operated (Yes in ACT S34), the control section 700 generates a transaction number that specifies the transaction and transmits transaction information obtained by further associating the transaction number with associated information in ACT S33 to the server 200 (ACT S35). The control section 700 then barcodes the transaction number generated in ACT S35 and issues a slip on which the barcode is printed by the printing section 116 (ACT S36). The control section 700 then returns to the processing in ACT S11. If it is determined that the subtotal key 1151 is not operated (No in ACT S31), the control section 700 returns to the processing in ACT S11.

Figure 9:
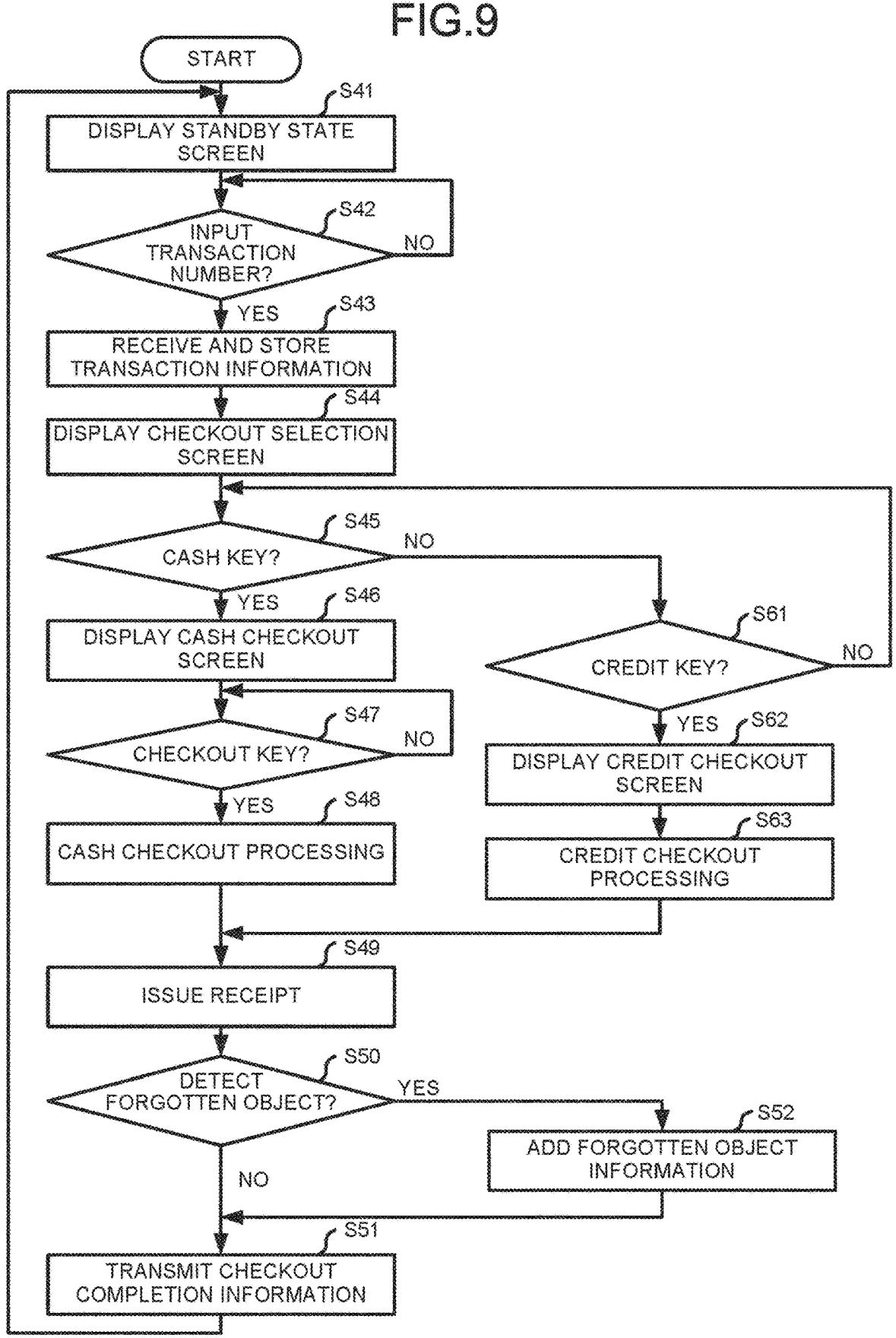
FIG. 9 is a flowchart depicting the flow of a control processing in the checkout device.

Next, the control processing executed by the control section 800 of the checkout device 103 executing the checkout processing through the operation by the customer C according to the control program stored in the control program section 841 is described. FIG. 9 is a flowchart depicting the flow of the control processing in the checkout device 103. As shown in FIG. 9, the control section 800 displays a standby state screen until reception of the transaction information from the data registration device 102 (ACT S41). Then, the control section 800 determines whether or not the barcoded transaction number is input by using the handy scanner 7 (ACT S42). The control section 800 waits for until the barcoded transaction number is input (No in ACT S42), and if it is determined that the barcoded transaction number is input to the checkout device 103 (Yes in ACT S42), the control section 800 requests the transaction information corresponding to the input transaction number from the server 200.

The control section 800 stores the transaction information received from the server 200 in response to the request in the transaction information section 831 (ACT S43). The transaction information stored in ACT S43 does not include the captured image of the customer.

Then, the control section 800 displays a checkout selection screen (not shown) for selecting a method by which the customer C performs the checkout (in the embodiment, a checkout in cash (hereinafter, referred to as "cash checkout") or a checkout in credit card (hereinafter, referred to as "credit checkout")) (ACT S44).

Next, the control section 800 determines whether or not the cash checkout is selected by the operation of the customer C (ACT S45). If it is determined that the cash checkout is selected (Yes in ACT S45), the control section 800 displays a checkout screen by the cash (ACT S46). Based on the transaction information stored in the transaction information section 831, the control section 800 displays the commodity information (the commodity name and the unit price) of the commodity to be purchased by the customer C, total amount information, tax information, payment information indicating payment by the customer, and the like on the display section 61.

Next, the control section 800 determines whether or not the payment amount is deposited by the customer C and the checkout key 621 is operated (ACT S47). The control section 800 waits for until it is operated (No in ACT S47), and if it is determined that the checkout key 621 is operated (Yes in ACT S47), the control section 800 executes a cash checkout processing based on the payment amount and the deposit amount (ACT S48). If there is change, the control section 800 operates the change dispensing machine 4 in this cash checkout processing and pays out the change. Then the control section 800 operates the printing section 9 to issue a receipt on which the commodity name, the unit price, the total price, the tax amount, the payment amount, the deposit amount, the change amount, and the like are printed (ACT S49).

Next, the control section 800 determines whether or not there is a forgotten object in the vicinity of the checkout device 103 (ACT S50). The control section 800 analyzes the image in the vicinity of the checkout device 103 captured by the camera K2 and determines whether a foreign object such as a wallet is placed on a surface of the checkout device 103. For example, the determination includes determination of presence or absence of the foreign object by comparing a previously captured image of the vicinity of the checkout device 103 (e.g., at some time during step S41 while the standby state screen is displayed) and the current image of the vicinity of the checkout device 103 captured by the camera K2. If it is determined that there is the foreign object based on the difference between the images, the control section 800 determines that there is the forgotten object in the vicinity of the checkout device 103.

If it is determined that there is no forgotten object in the vicinity of the checkout device 103 (No in ACT S50), the control section 800 sends the checkout completion information indicating that the checkout processing is completed for the transaction to the server 200 together with the transaction number of the transaction (ACT S51). On the other hand, if it is determined that there is a forgotten object in the vicinity of the checkout device 103 (Yes in ACT S50), the control section 800 adds information indicating that a forgotten object is present in the checkout completion information (ACT S52). Then, the control section 800 executes the processing in ACT S51. The control section 800 then returns to the processing in ACT S41.

On the other hand, if it is determined in ACT S45 that the cash checkout is not selected by the operation of the customer C (No in ACT S45), the control section 800 determines whether or not the credit checkout is selected by the operation of the customer C (ACT S61). If it is determined that the credit checkout is selected (Yes in ACT S61), the control section 800 displays a checkout screen for using the credit card (ACT S62). The control section 800 displays the commodity information (the commodity name and the unit price), the total price and the like of the commodity to be purchased by the customer C based on the transaction information. The control section 800 then executes a credit checkout processing based on the credit card (ACT S63). Then, the control section 800 executes the processing in ACT S49. If it is determined that the credit checkout is not selected (No in ACT S61), the control section 800 returns to the processing in ACT S45.

Figure 10:
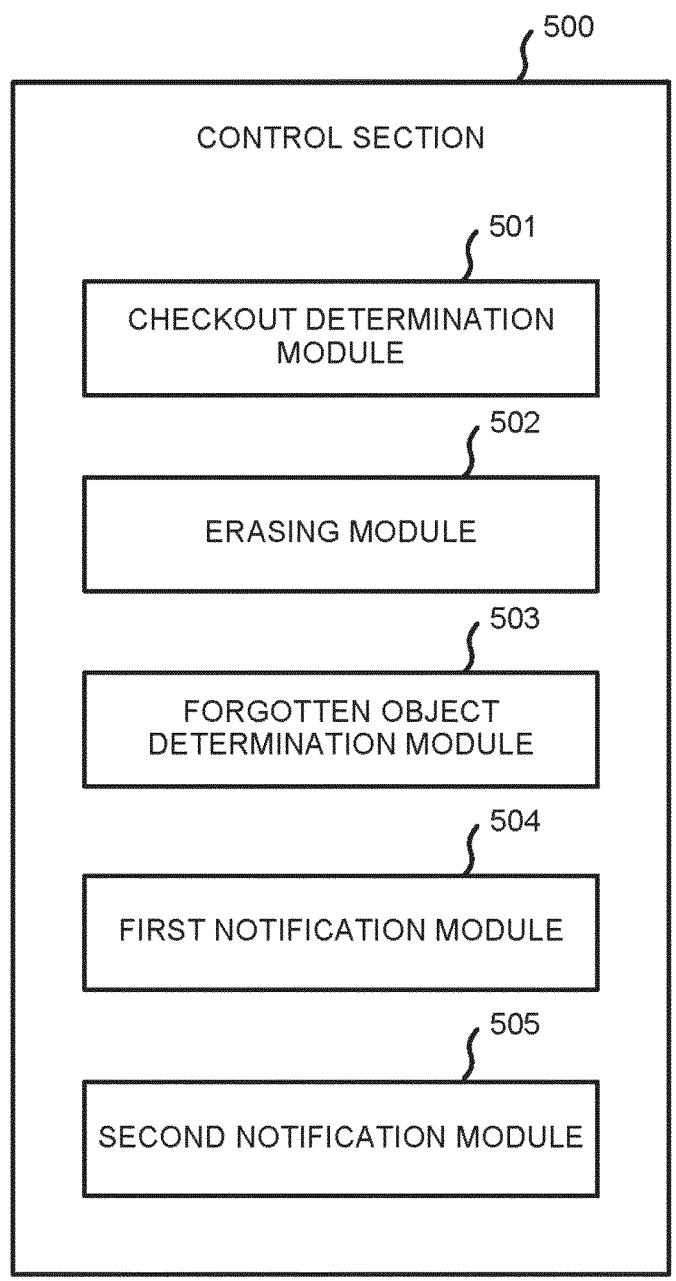
FIG. 10 is a functional block diagram illustrating the functional components of the server.

Next, the control processing executed by the control section 500 of the server 200 according to the control program stored in the control program section 541 of the storage section 54 is described. FIG. 10 is a functional block diagram illustrating the functional component of the server 200. The control section 500 functions as a checkout determination module 501, an erasing module 502, a forgotten object determination module 503, a first notification module 504, and a second notification module 505 by reading out the control program stored in the ROM 52 and the storage section 54 and copied or decompressed into the RAM 53 and executing it by the CPU 51.

The checkout determination module 501 has a function of determining whether or not the checkout processing on the transaction has completed.

The erasing module 502 has a function of erasing the captured image of the customer relating to the transaction stored in the storage section 543 at a predetermined timing after the checkout determination module 501 determines that the checkout processing has completed.

The forgotten object determination module 503 has a function of determining whether or not the customer leaves an object behind in the vicinity of the checkout device 103 with which the customer performs the checkout operation on the purchased commodity.

The first notification module 504 has a function of transmitting a first message indicating that there is the forgotten object in the vicinity of the checkout device 103 on the display section 210 installed in the retail store to the display section 210 on condition that the forgotten object determination module 503 determines that the customer leaves an object behind.

The second notification module 505 has a function of transmitting a second message indicating that the checkout processing has not completed on the display section 210 to the display section 210 on condition that a person captured by the camera K4 is determined to be coincident with a person contained in the captured image stored in the storage section 543.

Figure 11:
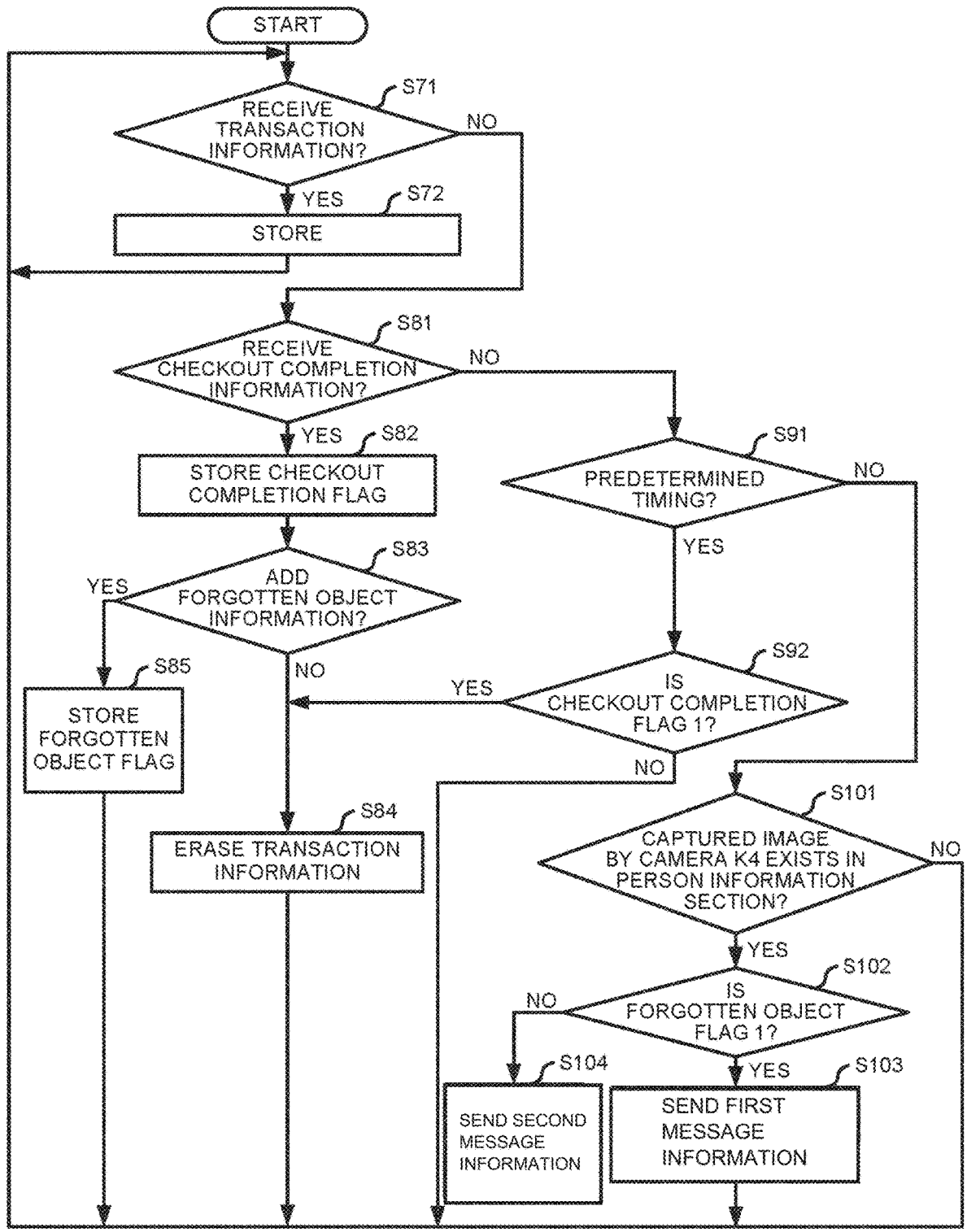
FIG. 11 is a flowchart depicting a flow of control processing in the server.

FIG. 11 is a flowchart depicting the flow of the control processing by the server 200. As shown in FIG. 11, the control section 500 determines whether or not the transaction information is received from the data registration device 102 via the communication line NT (ACT S71). If it is determined that the transaction information is received by the server 200 (Yes in ACT S71), the control section 500 stores the transaction information in the transaction information section 543 (ACT S72). The control section 500 stores the transaction number of the received transaction information in the transaction number section 5431. The control section 500 stores the commodity information of the received transaction information in the commodity information section 5432. The control section 500 stores the captured image corresponding to the received transaction information in the image information section 5433. The control section 500 stores facial parts information and clothing information of the customer generated based on the captured image stored in the image information section 5433 in the person information section 5434. The control section 500 then returns to the processing in ACT S71.

On the other hand, if it is determined that the transaction information is not received from the data registration device 102 (No in ACT S71), the control section 500 (in particular, the checkout determination module 501) determines whether or not the checkout completion information is received from the checkout device 103 (ACT S81). If it is determined that the checkout completion information is received from the checkout device 103 (Yes in ACT S81), the control section 500 determines that the transaction stored in step S72 is the transaction in which the checkout processing has completed. Therefore, the control section 500 stores the checkout completion flag "1" in the checkout completion flag section 5436 corresponding to the transaction number of the transaction (ACT S82).

Next, the control section 500 (in particular, the forgotten object determination module 503) determines whether or not the forgotten object information is added to the checkout completion information received in ACT S81 (ACT S83). If it is determined that the forgotten object information is added to the checkout completion information (i.e., there is a forgotten object) (Yes in ACT S83), the control section 500 stores the forgotten object flag "1" in the forgotten object flag section 5435 corresponding to the transaction number of the transaction (ACT S85). The control section 500 then returns to the processing in ACT S71. On the other hand, if it is determined that the forgotten object information is not added to the checkout completion information (i.e., there is no forgotten object) (No in ACT S83), the control section 500 erases the transaction information stored in step S72 (ACT S84). The control section 500 then returns to the processing in ACT S71.

On the other hand, if it is determined that the checkout completion information is not received from the checkout device 103 (No in ACT S81), the control section 500 determines whether or not it is a predetermined timing (ACT S91). If it is determined that it is the predetermined timing (Yes in ACT S91), the control section 500 determines whether or not the checkout completion flag "1" is stored in the checkout completion flag section 5436 (ACT S92). If it is determined that the checkout completion flag "1" is stored in the checkout completion flag section 5436 (Yes in ACT S92), the control section 500 executes the processing in ACT S84. In this case, the control section 500 erases the transaction information stored in step S72. If the checkout completion flag "1" is not stored in the checkout completion flag section 5436 (No in ACT S92), the control section 500 returns to the processing in ACT S71.

The transaction information section 543 stores the transaction information of the customer who has not yet carried out the checkout processing, or the transaction information of the customer who carried out the checkout processing but has been determined to have left an object behind in the vicinity of the checkout device 103. The transaction information of the customer who carried out the checkout processing and does not leave the object behind is erased from the transaction information section 543 at a time point at which it is determined that the checkout completion information has been received (i.e., it is determined that the checkout processing has completed). The transaction information of the customer who carried out the checkout processing but has been determined to have left an object behind is not erased at the time point at which it is determined that the checkout completion information is received, and is erased at a predetermined timing after the checkout completion information is received.

If it is determined that it is not yet the predetermined timing (No in ACT S91), the control section 500 compares the information stored in the person information section 5434 with the facial parts information and the clothing information generated from the captured image of the person who passes through the vicinity of the exit and entrance G, which is captured by the camera K4. Then, the control section 500 determines whether or not the facial parts information and the clothing information generated from the image captured by the camera K4 match or very closely resemble the information stored in the person information section 5434 (ACT S101). If the facial parts information and the clothing information generated from the image captured by the camera K4 match or very closely resemble the information stored in the person information section 5434, there is a high possibility that the customer captured by the camera K4 and the customer stored in the image information section 5433 are the same person.

If the facial parts information and the clothing information generated from the image captured by the camera K4 match or very closely resemble the information stored in the person information section 5434 (i.e., there is a high possibility that they are the same person) (Yes in ACT S101), the control section 500 determines whether or not the forgotten object flag "1" is stored in the forgotten object flag section 5435 (ACT S102). If it is determined that the forgotten object flag "1" is stored in the forgotten object flag section 5435 (Yes in ACT S102), the control section 500 (in particular, the first notification module 504) transmits the first message information to the display section 210 so as to display a message indicating that there is a possibility that there was a forgotten object in the vicinity of the checkout device 103 on the display section 210 (ACT S103). When there is a possibility that the customer of the transaction of which the forgotten object flag "1" is stored in the forgotten object flag section 5435 leaves an object behind, the first message information is displayed on the display section 210 installed near the exit and entrance of the retail store to notify the customer who is about to leave the retail store that there is the forgotten object. The control section 500 then returns to the processing in S71.

On the other hand, if it is determined that the forgotten object flag section 5435 does not store the forgotten object flag "1" (No in ACT S102), the control section 500 (in particular, the second notification module 505) transmits the second message information to the display section 210 so as to display a message indicating that there is a possibility that the checkout has not yet completed on the display section 210 (ACT S104). When the customer of the transaction of which the forgotten object flag "1" is not stored in the forgotten object flag section 5435 possibly does not complete the checkout, the second message information is displayed on the display section 210 installed in the vicinity of the exit and entrance of the retail store to notify the customer who is about to leave the retail store that the checkout is not completed. The control section 500 then returns to the processing in ACT S71.

According to such an embodiment, even if the checkout completion information is received (i.e., even if the checkout processing has been completed), the server 200 does not erase the captured image of the customer who may have left an object behind, until the predetermined timing. Therefore, if the customer who notices the forgotten object visits the retail store again, it is possible to confirm whether the customer is the customer who leaves the object behind based on the remaining captured image.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

For example, in the embodiment, a semi-self-service type checkout apparatus provided with the registration device used by the store clerk to perform the registration operation of the commodity and the checkout device used by the customer to perform the checkout operation is described as an example. However, a self-service type checkout apparatus used by the customer to perform the registration operation and the checkout operation of the commodity may be used. In this case, the self-service type checkout apparatus becomes an information processing apparatus.

In the embodiment, the server 200 is described as an example of the information processing apparatus. However, the information processing apparatus may be the data registration device 102 or the checkout device 103.

In the embodiment, the transaction information in which the checkout processing is carried out and there is no forgotten object is deleted at the time point of receiving the checkout completion information; however, the present invention is not limited thereto, and the transaction information for which the checkout processing has completed and there is no forgotten object may be erased at a predetermined timing.

In the embodiment, the display section 210 is used as an example of the notification device; however, the notification device is not limited thereto, and for example, the notification device that makes notification by voice may be used.

The program executed in the server 200 of the embodiment is recorded in a computer-readable recording medium such as a CD-ROM, a FD (Flexible Disk), a CD-R, a DVD (Digital Versatile Disc) and the like in an installable format or executable format to be provided.

The program executed by the server 200 according to the embodiment may be stored in a computer connected to a network such as an Internet and be provided by being downloaded via the network. The program executed by the server 200 of the embodiment may be provided or distributed via the network such as the Internet.

Furthermore, the program executed by the server 200 of the embodiment may be provided by being incorporated in a ROM or the like in advance.

What is claimed is:

1. A checkout system, comprising:
    a register machine having a first camera for capturing an image of a customer initiating a transaction and configured to issue transaction information about the transaction including the image of the customer;
    a self-service checkout machine having a second camera for capturing an image of an area where checkout processing is carried out by the customer, and configured to:
        perform checkout processing on the transaction using the transaction information and generate checkout completion information,
        after performing the checkout processing, determine, using the captured image of the area, whether the customer may have left behind an item within the area,
        upon determining that the customer may have left behind an item, include additional information in the checkout completion information, and
        transmit the checkout completion information; and
    a server in communication with the register machine and the checkout machine, the server including
        a storage device, and
        a processor configured to:
            upon receipt of the transaction information from the register machine, store the transaction information including the image of the customer in the storage device,
            upon receipt of the checkout completion information from the checkout machine, determine whether the checkout completion information includes the additional information,
            when the checkout completion information includes the additional information, store the image of the customer in the storage device for a predetermined length of time and erase the stored image of the customer when the predetermined length of time has passed, and
            when the checkout completion information does not include the additional information, erase the image of the customer stored in the storage device.

2. The checkout system according to claim 1, wherein the checkout machine determines whether the customer may have left behind an item by comparing a first image taken by the second camera prior to the checkout processing and a second image taken by the second camera after the checkout processing.

3. The checkout system according to claim 2, further comprising:
    a store camera positioned to capture an image of a customer leaving the store, wherein
    the processor of the server is further configured to compare the image of the customer leaving the store and the image of the customer included in the transaction information, and to generate:
        a first notification indicating that the customer may have left behind an item when the image of the customer leaving the store matches the image of the customer included in the transaction information and the checkout completion information is received by the server and includes the additional information, and
        a second notification indicating that the customer has failed to complete the checkout processing when the image of the customer leaving the store matches the image of the customer included in the transaction information and the checkout completion information is not received.

4. The checkout system according to claim 1, wherein the second camera of the checkout machine captures an image of a table on which a commodity to be purchased by the customer is placed and a housing of the checkout machine.

5. The checkout system according to claim 1, wherein the checkout machine is located adjacent to the register machine.

6. The checkout system according to claim 1, wherein
the register machine is further configured to issue a transaction number together with the transaction information, and
the checkout machine performs the checkout processing upon receipt of an input of the transaction number by the customer.

7. The checkout system according to claim 3, further comprising:
a display device arranged at an entrance or an exit of a store and configured to display one of the first and second notifications.

8. A method carried out by a checkout system including a register machine having a first camera for capturing an image of a customer initiating a transaction, a self-service checkout machine having a second camera for capturing an image of an area where checkout processing is carried out by the customer and configured to perform checkout processing on the transaction, and a server in communication with the register machine and the checkout machine, said method comprising:
issuing transaction information relating to the transaction including an image of the customer captured with the first camera;
performing checkout processing on the transaction using the transaction information and generating checkout completion information;
after performing the checkout processing, determining, using the image of the area captured with the second camera, whether the customer may have left behind an item within the predetermined area;
upon determining that the customer may have left behind an item, including additional information in the checkout completion information;
transmitting the checkout completion information from the checkout machine to the server;
upon receipt of the transaction information from the register machine, storing in the server the transaction information including the image of the customer in the storage device;
upon receipt of the checkout completion information from the checkout machine, determining whether the checkout completion information includes the additional information;
when the checkout completion information includes the additional information, storing the image of the customer in the server for a predetermined length of time and erasing the stored image of the customer when the predetermined length of time has passed, and
when the checkout completion information does not include the additional information, erasing the image of the customer stored in the server.

9. The method according to claim 8, said method further comprising:
determining whether the customer may have left behind an item by comparing a first image taken by the second camera prior to the checkout processing and a second image taken by the second camera after the checkout processing.

10. The method according to claim 9, further comprising:
capturing an image of a customer leaving the store with a store camera;
comparing the image of the customer leaving the store and the image of the customer included in the transaction information; and
generating:
a first notification indicating that the customer may have left behind an item when the image of the customer leaving the store matches the image of the customer included in the transaction information and the checkout completion information is received by the server and includes the additional information, and
a second notification indicating that the customer has failed to complete the checkout processing when the image of the customer leaving the store matches the image of the customer included in the transaction information and the checkout completion information is not received.

11. The method according to claim 8, wherein the second camera of the checkout machine captures an image of a table on which a commodity to be purchased by the customer is placed and a housing of the checkout machine.

12. The method according to claim 8, wherein the checkout machine is located adjacent to the register machine.

13. The method according to claim 8, further comprising:
issuing a transaction number together with the transaction information, wherein
the checkout processing is performed upon receipt of an input of the transaction number by the customer.

14. The method according to claim 10, further comprising:
displaying one of the first and second notifications on a display device arranged at an entrance or an exit of a store.

* * * * *